(12) United States Patent
Bowater et al.

(10) Patent No.: US 6,223,153 B1
(45) Date of Patent: Apr. 24, 2001

(54) VARIATION IN PLAYBACK SPEED OF A STORED AUDIO DATA SIGNAL ENCODED USING A HISTORY BASED ENCODING TECHNIQUE

(75) Inventors: Ronald John Bowater, Romsey; Michael Cobbett; Mervyn Aubony Staton, both of Eastleigh, all of (GB)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 08/594,054

(22) Filed: Jan. 30, 1996

(30) Foreign Application Priority Data

Sep. 30, 1995 (GB) .................................................. 9520023

(51) Int. Cl.⁷ ........................................................ G10L 1/00
(52) U.S. Cl. ........................................... 704/219; 704/211
(58) Field of Search ..................................... 395/2.2, 2.28, 395/2.71, 2.76, 2.25; 704/211, 219, 216, 262, 267

(56) References Cited

U.S. PATENT DOCUMENTS 4,435,832 * 3/1984 Asada et al. .......................... 395/2.77
4,864,620 * 9/1989 Bialick ................................ 395/2.25
5,175,769 * 12/1992 Hejna, Jr. et al. ..................... 395/2.2

OTHER PUBLICATIONS

Aspen Quick Reference Guide, Octel Communications Corporation, 2 pages.

ETSM—Entopic Time–Scale Modification Software promotional leaflet, 4 pages.

"Speech Coding and Speech Recognition Technologies: A Review", IEEE International Symposium on circuits and Systems, 1991, pp. 575–577, vol. 1.

* cited by examiner

Primary Examiner—Kee M. Tung
(74) Attorney, Agent, or Firm—Jeanine S. Ray-Yarletts

(57) ABSTRACT

The invention relates to a voice processing system capable of varying the speed of output of digitized audio data stored therein. The digitized audio data is stored using blocks of LPC coefficients. Each block is sufficient to allow twenty milliseconds of speech to be generated therefrom. Periodically, or selectably, the utilization of particular blocks is repeated resulting in a decrease in the speed of output of the speech synthesized therefrom. Alternatively, selectably blocks of LPC coefficients are omitted from use thereby producing a corresponding increase in speech output.

24 Claims, 4 Drawing Sheets

Figure 1:
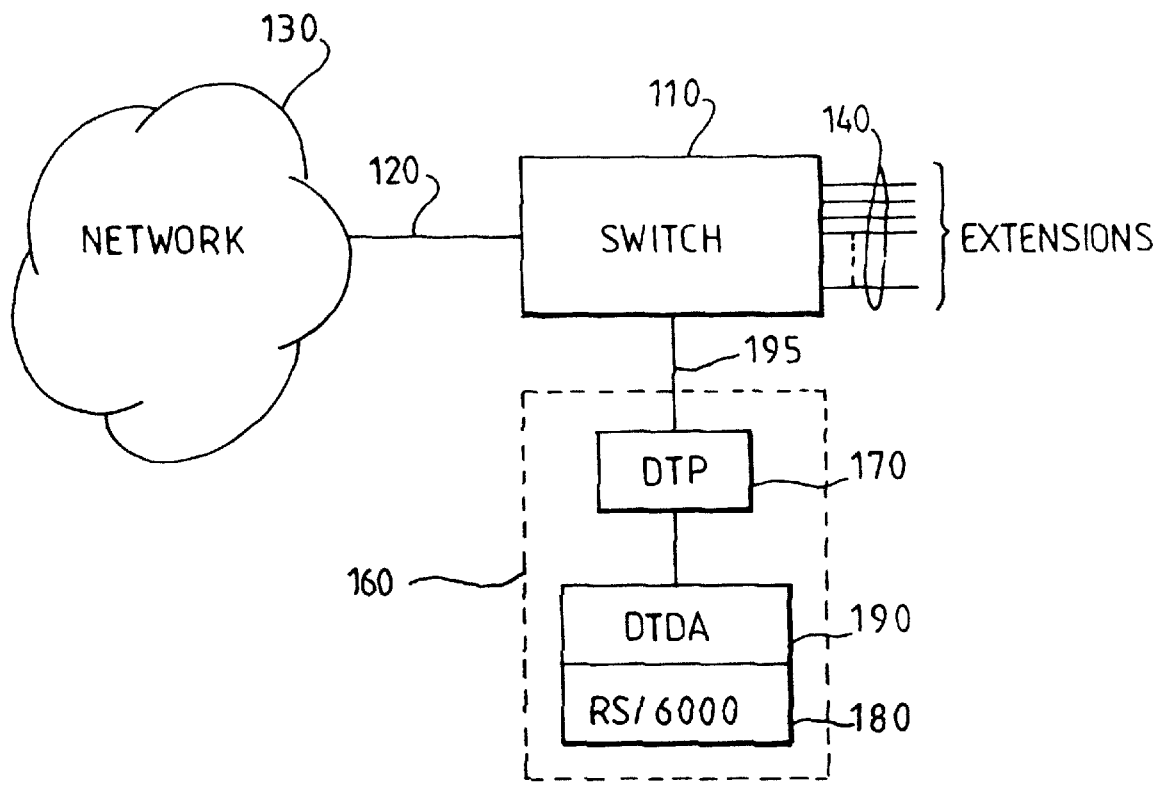

VARIATION IN PLAYBACK SPEED OF A STORED AUDIO DATA SIGNAL ENCODED USING A HISTORY BASED ENCODING TECHNIQUE

The present invention relates to a voice processing system and method.

Voice processing systems, which are well-known in the art (see for example "Voice Processing", by Walt Teschner, published by Artech House), perform a variety of functions, the most common of which is voice mail (also known as voice messaging), whereby callers who cannot reach their intended addressee can instead record a message for them for subsequent retrieval. It is occasionally desirable to be able to skip through a stored voice mail message; either forwards to the more important issues raised therein or backwards to listen to points again. The DirectTalkMail system available from International Business Machines Corporation allows one to skip through a message, either backwards or forwards, using keys seven and nine respectively, eight seconds at a time (see DirectTalkMail Guide SC33-1221-XX, available from International Business Machines Corporation). However, such skipping through does not allow one to concurrently listen to the message; to achieve that the system must provide for variable speed of output of the stored voice data. The speeding up and slowing down of the rate of output of stored voice data is provided in the Aspen voice mail system available from Octel Communications Corporation, incorporated in Delaware, USA. One of the problems associated with speeding up and slowing down the speed of output of a voice message is to avoid a significant variation in a pitch which substantially reduces the comprehensibility of the voice message. It is possible to obviate this variation in pitch using digital signal processing techniques. One example of these is provided in product ETSM available from Entropic Speech, Inc, incorporated in California, USA. However, the digital signal processing techniques utilised are very processor intensive and present a significant drain on processor capacity thereby making it difficult to perform the necessary processing in a realtime telephony environment.

Accordingly, the present invention provides a method for varying the speed of playback of digitised audio data derived from a sequence of encoded audio data units, comprising the steps of storing a set of digitised audio data units, processing said digitised audio data units by omitting or repeating selected digitised audio data units in accordance with a desired variation in speed, and outputting said processed digitised audio data units.

The present invention allows the speed of output of a voice message to be varied whilst preserving the pitch thereof. As a consequence of the pitch remaining substantially unchanged, the comprehensibility of the voice message at higher or lower speeds of output is much improved. Further, the present invention affords a very simple and a processor inexpensive manner of achieving a variation in the speed of output of voice messages whilst maintaining pitch. As the processing involves repeating or omitting the utilisation of digitised audio data units without further processing, the processor overhead is significantly reduced.

An embodiment provides a method wherein said digitised audio data units are encoded using a history based encoding technique. History based techniques, such as those which utilise differences between successive segments of audio data, are particularly effective for use in the present invention. The history based techniques as they contain information related to or derived from previous audio data units enable good quality audio data to be generated therefrom notwithstanding that previous audio data units have been omitting or repeated.

An embodiment provides a method wherein said encoded audio data blocks represent Linear Predictive Coding (LPC) coefficients. The use of LPC coefficients to represent digitised voice has the dual benefit of, first, allowing very good quality speech to be derived therefrom and, secondly, being very efficient in terms of storage and processing overhead. It is important for voice mail systems to be able to store data in compressed form in order to efficiently utilise storage capacity. Further, the ability to repeat or omit the use of LPC blocks reduces processor overhead as the omission or repetition is performed before decompression or decoding of the LPC blocks. Thus the amount of data which is processed as compared with unencoded data is substantially reduced thereby reducing processor loading.

Preferably the percentage variation in the speed of playback is between 50° to 200%. A practical implementation of the present invention indicates that the comprehensibility of the audio signal derived from the digitised audio data units starts to degrade when the speed of playback is outside the above range.

It is preferred that the digitised audio data units represent between 5 msec and 50 msec of audio data. Using speech in blocks of between 5 msec and 50 msec enables a compromise to be reached between granularity and speed of searching. A practical implementation has found that 20 msec represent a good compromise. If the time period of audio data represented by the LPC coefficients is too small, the processor may become unduly loaded as a consequence of handling a large number of small blocks. In addition, it is believed that a lower limit on the duration of the speech may arise from the LPC coefficients. This lower limit is determined by the dynamics of the human ear, that is an LPC block may have to allow slightly more than one complete cycle of the lowest frequency present to be derived therefrom in order that that cycle is discernable by the human ear. However, if the time period represented by the LPC coefficients is too large, discernable repetition or stutter will be audible in the resultant audio signal derived therefrom.

The present invention also provides a voice mail system comprising means for storing voice messages comprising a set of digitised audio data units, means for playing back the stored message including means for varying the speed of playback, means for processing said digitised audio data units by omitting or repeating selected digitised audio data units in accordance with a desired variation in speed, and means for outputting said processed digitised audio data units.

Figure 2:
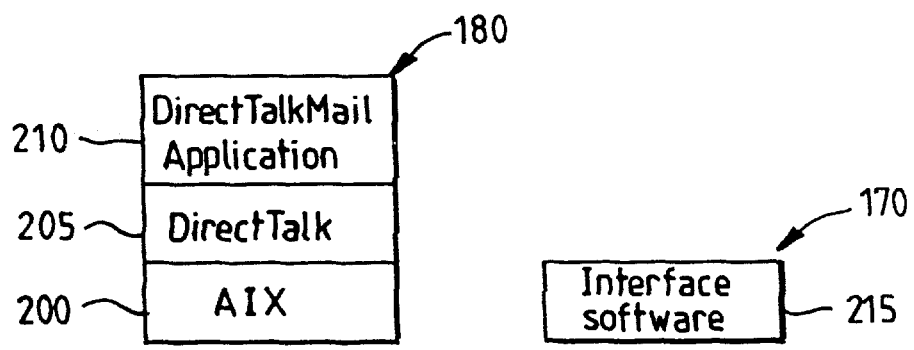
Figure 3:
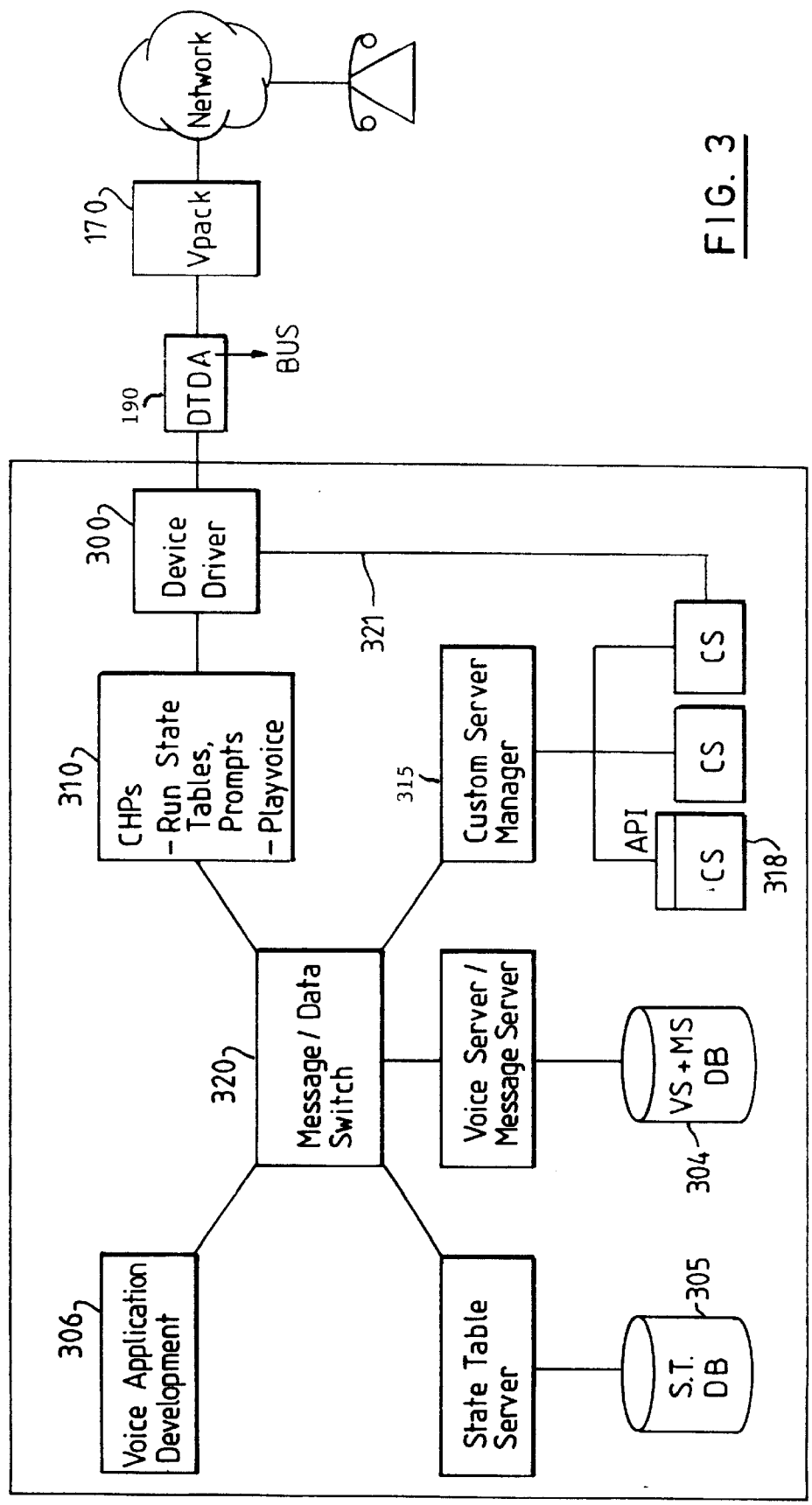
Figure 4:
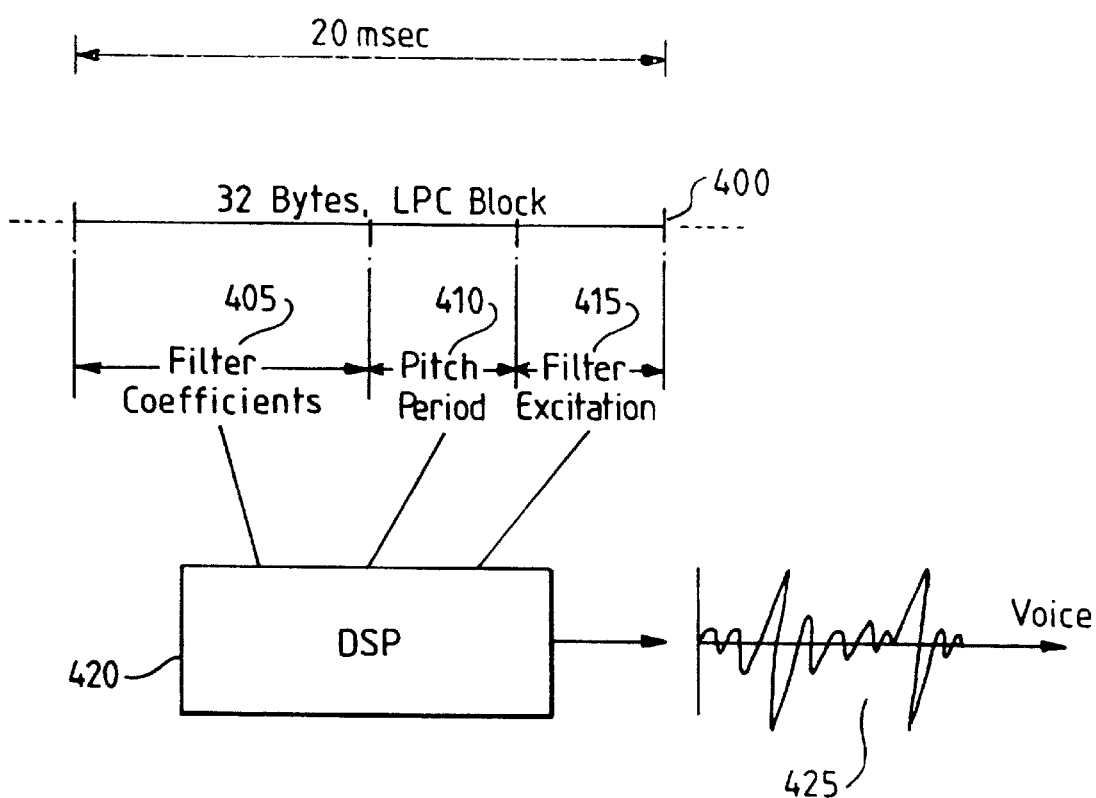
Figure 5:
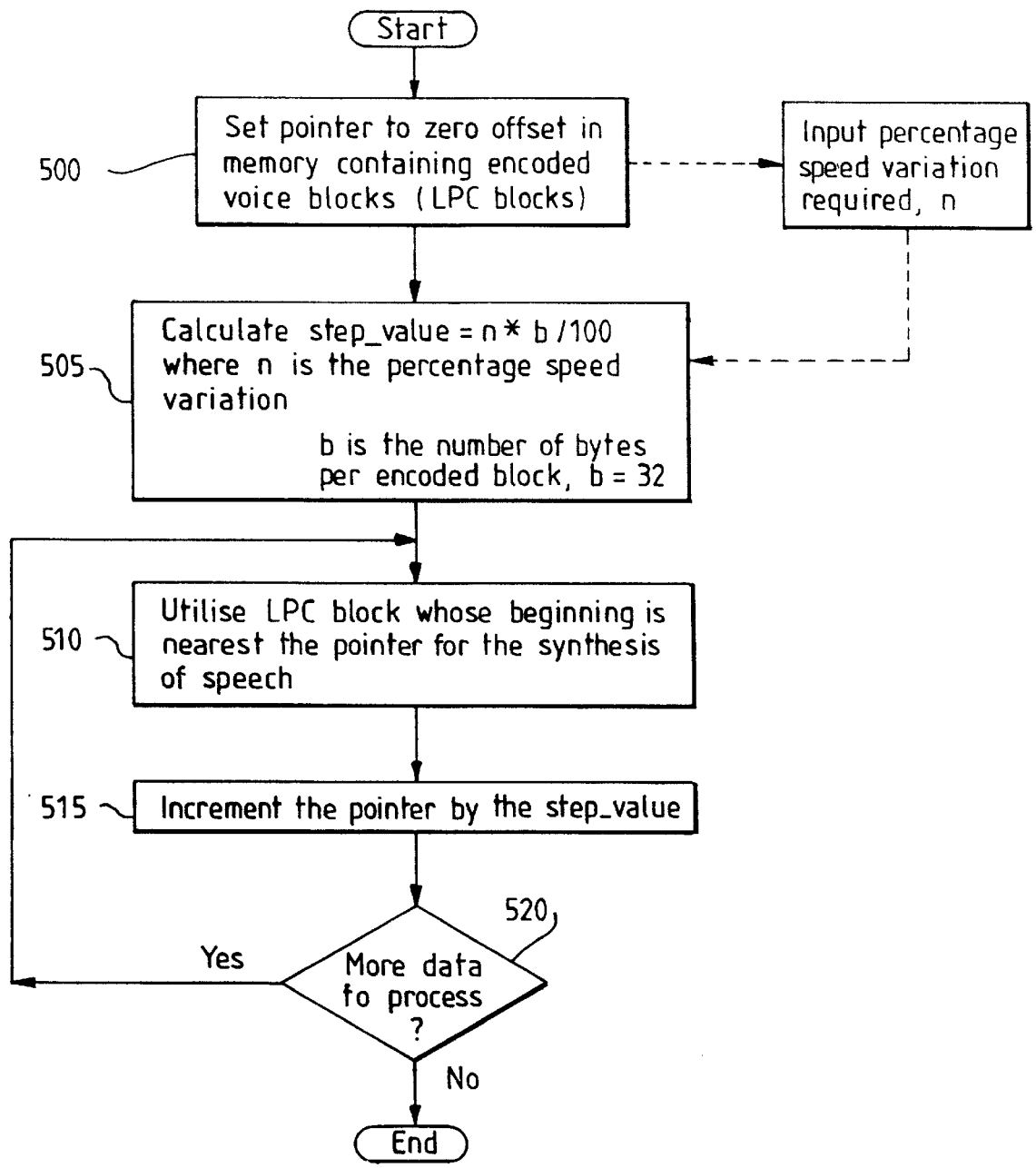

Embodiments of the invention will now be described in detail, by way of example only, with reference to the following drawings:

FIG. 1 is a simple block diagram showing a voice processing system connected to a telephone switch, FIG. 2 illustrates the main software components of the voice processing system of figure l, FIG. 3 shows a more detailed diagram of the structure of the voice processing system of FIG. 1, FIG. 4 illustrates schematically the operation of an embodiment, FIG. 5 shows a schematic flow diagram of an embodiment.

FIG. 1 is a simple block diagram showing a switch 10 which exchanges telephony signals with the external telephone network 130 over digital trunk line 120. Attached to the switch are a plurality of conventional telephone extensions 140. However, these are of no direct relevance to the present invention and so will not be described further. Also attached to the switch via a digital trunk line 195 is a voice processing system 160. In the current implementation, the voice processing system is a DirectTalk/6000 system (ie runs the DirectTalk/6000 software), but the same principles apply whatever voice processing system is being used.

The DirectTalk/6000 system comprises two main hardware components, a digital trunk processor 170, and computer workstation 180, which in the case of the DirectTalk/6000 system is a RISC System/6000. Also shown is an adapter card 190 (DTDA), which provides an interface between the RISC System/6000 and the telephone interface module. Note that in many voice processing systems, the telephone interface module is incorporated into the adapter card for direct attachment to the computer workstation. The DirectTalk/6000 system (software plus hardware) is available from IBM Corporation, and is described more fully in IBM Callpath DirectTalk/6000 General Information and Planning (reference number GC22-0100-03) and other manuals mentioned therein, also available from IBM. As stated above, although the invention is being described with reference to the DirectTalk system, it is applicable to many other voice processing systems; such as voice mail boxes for mobile telephones or other types of answer-phone.

FIG. 2 is a simple block diagram of the main software components of a DirectTalk/6000 system. Running on the RISC System/6000 is the operating system 200 for the workstation, which in the present case is AIX, and the DirectTalk/6000 software 205 itself. Also running on the RISC System/6000 workstation is an application 210, in this case DirectTalkMail, which interacts With the operating system and the DirectTalk/6000 software to provide the desired, voice mail function. Various routines 215 also run within the digital trunk processor 170. These routines are downloaded from the RISC System/6000 onto the telephone interface module when the telephone interface module is enabled, and handle items such as detection of tones, silence, voice, generation of tones and compression/decompression of voice.

FIG. 3 is a schematic diagram of the main components of a DirectTalk/6000 system. Only those components relevant to an understanding of the present invention will be described: further details can be found in the above-mentioned manuals. The first set of components run on the RISC System/6000 workstation 180 and comprise a device driver 300 which is used to interact via the adapter card 190 (Dual Trunk Digital Adapter, DTDA) with the digital trunk processor 170. A state table 305 provides the program control of applications executing in the DirectTalk/6000 system (ie in developing an application, the customer creates a set of state tables). The channel processor (CHP) 310 contains the code which performs the actions specified by the state tables 305. A custom server manager 315 allows external connections into and out of the DirectTalk/6000 system. The customer server 318 can operate in one of two modes. Firstly, it can perform simple functions as requested by a state table and return data as appropriate. Secondly, it can fetch voice data from the voice segment database 304 via the message/data switch 320, process that data and then feed it directly to the device driver 300 via the custom server voice services interface communication 321. The above is described in more detail in DirectTalk/6000 Voice Application Development Guide SC22-0102-03, specifically under the routine CA_Play_Voice_Stream.

The DirectTalkMail voice messaging system itself can be considered as a form of database system, based on mailboxes. Thus each user has a mailbox, which has associated with it all the information for that user, eg their extension number, their password, the number of new messages that they have, their current greeting, and so on. The mailbox also logically contains the digitised stored messages for that user (although physically the audio recording may be stored in a different location from the other information). Each mailbox has a unique identifier, such as a number or name, for example, each mailbox can be allocated the extension number of the user associated with that mailbox. The DirectTalkMail voice messaging system also contains routines to allow callers to telephone messages into the database and users to extract messages from the database for listening over the telephone, as well as other functions such as forwarding messages. The operation of a voice mail system in such a manner is well-known and so will not be described further.

Within the DirectTalk/6000 system the voice messages are stored in the voice server/message server data base 304 in compressed form using the 5:1 compression GSM algorithm. The GSM standard can be found in the GSM Recommendations, more particularly, in recommendation 6.01, entitled "Speech Processing functions: General description", and recommendation 6.10, entitled "GSM Full rate Speech Transcoding". Referring to FIG. 4, the compressed voice data is stored in 32 byte data blocks 400, each block containing a set of Linear Predictive Coding (LPC) parameters 405 410 415 which allows 20 milliseconds of speech to be synthesised. The LPC parameters 405 410 415 are passed to a suitably arranged DSP 420 for conversion to speech 425. LPC coding, and other speech coding technologies, and the synthesis of speech therefrom are well known within the art and described in, for example, "Speech Coding and Speech Recognition Technologies: A review", IEEE International Symposium on Circuits and Systems 1991 p572–7 vol.1. Although the current embodiment is described in terms of using LPC coefficients other suitable encoding schemes may be used such as Code Excited Linear Prediction (CELP) as is known in the art. The LPC coefficients are used in the conventional manner to generate speech output; that is 50 blocks per second are fed to a digital trunk processor thereby allowing realtime 8 kHz speech to be generated therefrom, However, according to the present invention, selectable blocks of LPC coefficients are either repeated or not utilised at all when synthesising the speech. For example, assume the LPC blocks, labelled A to Z, are fed to the DSP in the following sequence:

*ABCDE . . . XYZ,* the rate of output of the speech synthesised therefrom can be doubled by utilising only every other LPC block. Hence the blocks used for synthesis would be:

*ACEGIK . . .* etc.

thereby doubling the rate of speech output. The rate of output of speech can be halved by utilising every LPC block twice. Hence the LPC blocks used for synthesising speech would be

*A A B B C C D D E E F F . . .* etc.

For the embodiment described, it will be appreciated that the basic pitch of the synthesised voice is substantially unchanged by repeating or omitting LPC blocks in the manner enunciated above. This follows as a consequence of the lowest pitch period of the human voice being entirely contained within a single block. The compression process relies upon a "history" being passed from one block to the next, and the LPC parameters being an encoding difference between successive blocks. When blocks are skipped or repeated, there is clearly a mismatch between the history and the data block which leads to some distortion. However, the result is still acceptable and is almost unnoticeable for small values of speed variation. The discontinuities between blocks causing distortion are in fact smoothed out by the low pass filters which are a part of the LPC decompression process.

Variations in the speed of output of the synthesised speech other than halving or doubling can be achieved by repeating the output of say, every, fifth LPC block or omitting to output every fifth LPC block.

An algorithm for generating the above sequence is based upon simple linear interpolation. It will be appreciated by one skilled in the art that other algorithms are suitable, for example a Digital Differential Analyser such as the Bresenham algorithm (see Principles of Interactive Computer Graphics, second edition, Newman and Sproull, McGraw-Hill Book Company, 1979).

An embodiment can be realised using the following pseudo-code implementation (references to steps are to the steps of FIG. 5). Assume that the LPC or voice data is stored in contiguous blocks of memory.

1. Set pointer, P, equal to zero offset into blocks of LPC coefficients, (step 500)
2. Set the step_value=n*32/100, where n is the percentage speed variation required (100 normal, 200=double speed, 50=half speed), (step 505)
3. Do until end of LPC data {utilise in synthesis block nearest to the pointer, increment the pointer by stepvalue, }, (steps 510, 515 and 520)

The following example would result in a twenty-percent increase in the speed of output of speed:

n=120, LPC size=32 bytes, Step Size=38

TABLE 1

| Time Period Before | Pointer Used After | Block | Pointer | |
|---|---|---|---|---|
| 0 | 0 | 0 | 38 | |
| 20 | 38 | 32 | 76 | |
| 40 | 76 | 64 | 114 | |
| 60 | 114 | 128 | 152 | * Skip 96 |
| 80 | 152 | 160 | 190 | |
| 100 | 190 | 192 | 228 | |
| 120 | 228 | 224 | 266 | |
| 140 | 266 | 256 | 304 | * |
| 160 | 304 | 288 | 342 | * Skip 320 |
| 180 | 342 | 352 | 380 | |
| 200 | 380 | 384 | 418 | |
| 220 | 418 | 416 | 456 | |
| 240 | 456 | 448 | 494 | |
| 260 | 494 | 480 | 532 | * Skip 512 |
| 280 | 532 | 544 | 570 | |
| 300 | 570 | 576 | 608 | |
| 320 | 608 | 608 | 646 | |
| 340 | 646 | 640 | 684 | |
| 360 | 684 | 672 | 722 | * Skip 704 |
| 380 | 722 | 736 | 760 | |

It can be seen from table one that approximately one in five blocks are skipped, giving the desired variation in output speed.

The following example results in a decrease in the speed of output of the synthesised speech.

Percentage Variation=80, LPC block size=32, step size=26

TABLE 2

| Time Period Before | Pointer Used After | Block | Pointer | |
|---|---|---|---|---|
| 0 | 0 | 0 | 26 | |
| 20 | 26 | 32 | 52 | |
| 40 | 52 | 64 | 78 | |
| 60 | 78 | 64 | 104 | * Repeat 64 |
| 80 | 104 | 96 | 130 | |
| 100 | 130 | 128 | 156 | |
| 120 | 156 | 160 | 182 | |
| 140 | 182 | 192 | 208 | |
| 160 | 208 | 192 | 234 | * Repeat 192 |
| 180 | 234 | 224 | 260 | |
| 200 | 260 | 256 | 286 | |
| 220 | 286 | 288 | 312 | |
| 240 | 312 | 320 | 338 | |
| 260 | 338 | 352 | 364 | |
| 280 | 364 | 352 | 390 | * Repeat 352 |
| 300 | 390 | 384 | 416 | |
| 320 | 416 | 416 | 442 | |
| 340 | 442 | 448 | 468 | |
| 360 | 468 | 480 | 494 | |
| 380 | 494 | 480 | 520 | * Repeat 480 |

It can be seen that particular blocks have been repeated thereby reducing the rate of output of the speech synthesised from the LPC blocks. The repetition occurs approximately one block in every five.

FIG. 5 illustrates a schematic flow diagram for an embodiment of the present invention. It is assumed that the LPC data blocks are already stored in memory and accessible using a pointer, P, thereto. At step 500 the pointer is set to a zero offset into the LPC or encoded data blocks. The step value is calculated using the general formula step_value=n*b/100 at step 505 where n is the percentage variation required and b is the number of bytes per LPC block. Steps 510 to 520 correspond to the "Do-loop" of the above pseudo-code. The LPC block utilised to synthesize speech is that block whose beginning is closest to the pointer. The pointer value is incremented by the step value at step 515. A determination is made at step 520 as to whether or not there exist more data to be processed. If so, processing continues with step 510. If not, processing or the synthesis of speech is complete. It will be apparent that a different criterion can be used to select the LPC block for processing to that described above. For example, the LPC block within which the pointer is pointing could always be used instead of the closest LPC block. However, the quality of the synthesised voice may be comprised as a consequence.

The lowest frequency reproducible over a telephone network is approximately 200 Hz. This corresponds to a period of 5 milliseconds i.e. 4 cycles of the lowest frequency are contained within one 20 millisecond block. Hence, the block resequencing does not affect the voice pitch (or any frequencies contained therein).

The compression process relies upon a "history" being passed from one block to the next, and the LPC parameters being an encoding difference between successive blocks. When blocks are skipped or repeated, there is clearly a mismatch between the history and the data block which leads to some distortion, However, the result is still acceptable and is almost unnoticeable for small values of speed variation. The discontinuities between blocks causing distortion are in fact smoothed out by the low pass filters which are a part of the LPC decompression process.

The same technique could be used for uncompressed voice or audio data (mu-law or a-law data) resulting in 160 bytes per 20 millisecond block. However, the waveform discontinuities which occur at the non-configuous block boundaries would cause audio 'clicks' in any speech synthesised therefrom. However, these could easily be removed using digital signal processing to smooth the waveform over a period of, for example, four samples around the discontinuity.

It will be appreciated that the rate of output of speech can be made to vary for a particular message by varying the value of n throughout the output of the message. Accordingly, using key seven and key nine of the telephony pod, or other mechanism, to vary the value of n, variation in speed of output can be realised.

In an embodiment, the variation in speed of output of audio data is achieved using the DTMF keys of the telephone pad. The DTMF tones are detected by one of the DSPs in the DTP 170 implementing an appropriate digital filter. The DTP 170 informs the device driver 300 that a DTMF tone has been detected and the DTMF key to which the tone corresponds. The device driver then interrupts the output of the audio data by informing the custom server responsible for obtaining the digitised audio data units from the voice/message database. The custom server 318 then informs the state table server that the speed of output of the audio data should be varied. The state table calls CA_Play_Voice_Stream, as described above, indicating the new rate of output thereby causing the custom server to vary the rate output of digitised audio data accordingly.

What is claimed is:

1. A method for varying the speed of playback of a stored audio signal encoded as a sequence of digitised audio data blocks using a history based encoding technique, the audio data blocks each corresponding to a fixed time period of the audio signal, comprising the steps of accessing a stored set of digitised audio data blocks processing said set of digitised audio data blocks in encoded form by omitting or repeating complete selected digitised audio data blocks in accordance with a desired variation in speed, and decoding said processed digitised audio data blocks to produce an audio signal output, wherein said outputted audio signal has the desired variation in playback speed relative to the stored audio signal.

2. A method as claimed in claim 1, wherein said digitised audio data blocks are encoded as LPC coefficients.

3. A method as claimed in claim 2, wherein the digitised audio data blocks represent between 5 msec and 50 msec of audio data.

4. A method as claimed in claim 3, wherein the digitised audio data blocks represent 20 msec of audio data.

5. A method as claimed in claim 4, wherein the variation in speed of playback is between 50% and 200%.

6. A method as claimed in claim 3, wherein the variation in speed of playback is between 50% and 200%.

7. A method as claimed in claim 3, wherein the variation in speed of playback is between 50% and 200%.

8. A method as claimed in claim 1, wherein the digitised autio data blocks represent between 5 msec and 50 msec of audio data.

9. A method as claimed in claim 8, wherein the digitised audio data blocks represent 20 msec of audio data.

10. A method as claimed in claim 6, wherein the variation in speed of playback is between 50% and 200%.

11. A method as claimed in claim 2, wherein the variation in speed of playback is between 50% and 200%.

12. A method as claimed in claim 1, wherein the variation in speed of playback is between 50% and 200%.

13. A voice mail system comprising means for storing voice messages encoded as a set of digitised audio data blocks using a history based encoding technique, the audio data blocks each corresponding to a fixed time period of a voice message, means for playing back a stored message with a desired variation in playback speed relative to the original stored message including means for processing said audio data blocks in encoded form by omitting or repeating selected complete digitised audio data blocks in accordance with the desired variation in speed, and means for decoding said processed digitised audio data blocks and producing an audio output from said decoded digitised audio data blocks.

14. A voice mail system as claimed in claim 13, wherein said digitised audio data blocks are LPC coefficients.

15. A system as claimed in claim 14, wherein the digitised audio data blocks represent between 5 msec and 50 msec of audio data.

16. A system as claimed in claim 15, wherein the digitised audio data blocks represent 20 msec of audio data.

17. A system as claimed in claim 16, wherein the variation in speed of playback is between 50% and 200%.

18. A system as claimed in claim 15, wherein the variation in speed of playback is between 50% and 200%.

19. A system as claimed in claim 14, wherein the variation in speed of playback is between 50% and 200%.

20. A system as claimed in claim 13, wehrein the digitised audio data units represent between 5 msec and 50 msec of audio data.

21. A system as claimed in claim 20, wherein the digitised audio data blocks represent 20 msec of audio data.

22. A system as claimed in claim 21, wherein the variation in speed of playback is between 50% and 200%.

23. A system as claimed in claim 20, wherein the variation in speed of playback is between 50% and 200%.

24. A system as claimed in claim 13, wherein the variation in speed of playback is between 50% and 200%.

* * * * *